May 14, 1968  L. SPENADEL ET AL  3,382,806
TUBULAR PACKET
Filed May 1, 1959
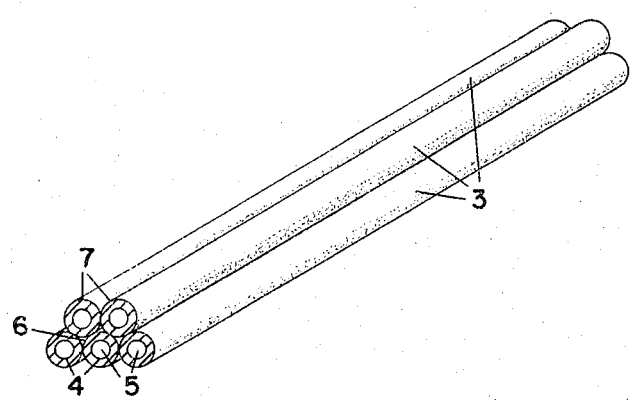
FIGURE-I
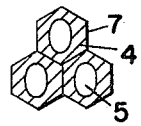
FIGURE-II
Lawrence Spenadel
William J. Sparks  Inventors
By R. D Manahan  Patent Attorney United States Patent Office 3,382,806
Patented May 14, 1968

3,382,806
TUBULAR PACKET
Lawrence Spenadel, Elizabeth, and William J. Sparks, Westfield, N.J., assignors to Esso Research and Engineering Company, a corporation of Delaware
Filed May 1, 1959, Ser. No. 810,503
10 Claims. (Cl. 102—100)

The present invention relates to tubular packets or sponges and the manufacture thereof. It also concerns the use of these packets in hybrid rocket propellant systems wherein the oxidizing agent is a liquid and is contained within the conduits formed by the tubes of said packets. Moreover, it relates to a method of combining a solid fuel with a liquid oxidizing agent to produce a propellant which has the properties of a solid.

There is considerable interest in the use of solid propellant systems in rockets because they are less difficult to handle and the rocket itself is simpler to design and construct. The type of rocket to which the present invention has particular application is the type of rocket propulsion device commonly designated as a "pure" rocket, that is to say, a thrust producer which does not make use of the surrounding atmosphere. The propellant system in these rockets comprise fuel and oxidizing material which react either spontaneously or upon ignition to produce gases which escape from the combustion chamber through a thrust nozzle to impart thrust to the rocket. Liquid oxidizing agents are generally more effective than their solid counterparts because of their high reactivity. However, considerable difficulty has been encountered in attempting to combine liquid oxidizing agents with solid fuels because of the tendency of the two materials to prematurely react. Moreover, it has been a problem to obtain the proper physical and mechanical properties for hybrid type propellant systems.

An object of the invention is to provide a new rocket propellant system which utilizes a liquid oxidizing agent and a solid fuel. Another object of the invention is to provide a method for making a liquid-solid rocket propellant which may be handled as a solid rocket propellant system.

In accordance with the present invention, a tubular packet or sponge is made by extruding tubes of a polymeric substance and adhering the tubes to each other. The tubular packet or sponge may be used as a hybrid rocket propellant system by introducing a liquid oxidizing agent into the openings in the tubes.

Since these tubular packets are highly useful in hybrid rocket propellant systems, the discussion of the invention will be mainly directed to this use.

The walls of the tubes may be used as a repository for solid fuels by compounding the fuels with the polymer prior to forming the tubes. When very large amounts of metal-containing substances are admixed with the polymer, the polymer is considered a binder for the fuel. On the other hand, it may be desirable to have the solid fuel in more intimate contact with the oxidizing agent, in which case the fuel may be dispersed in the oxidizing agent and the tube may serve merely to give the system sufficient structure to permit its use as a solid composition.

The tube may be of any shape, that is to say, it may be round, square, or hexagonal, and have a diameter of any given magnitude. In order to insure even and constant burning in the rocket's burning chamber, it is desirable to use hexagonal tubes having relatively small diameters, i.e., up to 1 inch. The hexagonal shaped tubes are easily bundled together to form a honeycomb pattern in which the exterior walls of the tubes are in close contact with each other. If the outer walls of the individual tubes are not sufficiently tacky to cause them to adhere to one another, it may be necessary to coat them with a suitable adhesive, e.g. nitrocellulose cement. The bundle of tubes may be shaped into any suitable form for burning. For example cruciform, triform and hexaform propellants have been found to be highly suitable in their burning properties. Since many of the tubes employed in accordance with the invention are highly flexible, they are easily conformed to the shape of the burning chamber of the rocket. It is even possible to make coils out of the tubes and pack these into the burning chamber.

FIGURE I is a perspective view of a section of a plurality of tubes made in accordance with the invention and filled with a liquid oxidizer.

FIGURE II is a transverse cross-sectional view of hexagonal tubes made in accordance with the invention and filled with a liquid oxidizer.

In one embodiment of the invention, the polymer is compounded with substantial amounts of solid fuel. The compounding may be achieved according to techniques which are well known in the polymer art. For instance, where the polymer is rubbery in nature, the fuel may be admixed with it on a rubber mill or in a Banbury mixer. Moreover, the polymer may be compounded with various curing agents and accelerators if it is capable of being cured by such substances. For instance, an unsaturated rubber such as isobutylene-isoprene butyl rubber may be compounded with 25 to 500 parts by weight of a solid fuel per 100 parts by weight of the polymer (php.), about 1 to 20 php. of sulfur and 1 to 5 php. of benzothiazyl disulfide. The compounded polymer may be cured at 280 to 340° F. for about 30 minutes after it has been extruded or otherwise formed into the desired size and shape tube. The semi-rigid tube obtained may then be filled with a liquid oxidizer either by vacuum, i.e. sucking, or by injection. If the outer surface of the tube is sufficiently tacky, the tubes may be bundled together and the packet of tubes cured, thereby causing the tubes to adhere to one another.

In another embodiment of the invention, the tube is compounded with little or no solid fuel, the principal portion of the solid fuel in the system being dispersed with the liquid oxidizing agent within the tube. In order to have a stable dispersion, it is necessary to either employ very finely divided solid fuel or resort to stabilizing substances such as gelling agents. For example, aluminum powder having an average particle size less than 1 micron may be colloidally dispersed in hydrogen peroxide and the dispersion injected into a semi-rigid tube which is sealed at each end to prevent the loss of oxidizing agent. Where these dispersions are not sufficiently stable, it is advisable to add less than 1 wt. percent of a gelling or thickening agent to the oxidizer-fuel mixture to impart stability. Suitable gelling agents include such things as carboxymethyl cellulose, polystyrene sulfonate, and polyethers. It has been found that as little as 0.02 to 0.5 wt. percent of the foregoing agents is sufficient to thicken the mixture so that the fuel and oxidizing agent remain in intimate contact over an extended period of time.

While the invention is not restricted to any particular size tube, it has been found beneficial to have the inside diameter of the tube exceed the thickness of the tube's wall, and it is preferred to use tubes in which the inside diameter is about 5 to 20 times greater than the thickness of the wall. By employing small, thin-walled tubes, that is to say, tubes having outside diameters in the range of 10 to 500 mils and 1 to 100 mils thick, good burning properties are obtained due to the close association of the oxidizer and the fuel. A particularly smooth burning packet of tubes is one in which the major proportion of the solid fuel is dispersed in the liquid oxidizing agent in the tubes. Because the tubes are small and thin walled, the packet burns as though the oxidizing agent, fuel and polymer were admixed with each other.

The polymer used to prepare the tubes of the present invention should be strong enough to maintain the oxidizing agent or oxidizing agent-solid fuel mixture within it. Among the extrudable solid polymers which have been found to be suitable are isobutylene-isoprene butyl rubber, polyisobutylene, styrene butadiene rubber, polyethylene, polypropylene, tetrafluoroethylene, hexafluoropropylene-vinylidene fluoride copolymer, chlorotrifluoroethylene-vinylidene fluoride copolymer, polyvinyl chloride, butadiene-acrylonitrile copolymer and mixtures thereof. These polymers have softening points above about 125° F. and/or Staudinger molecular weights of about 10,000 to 125,000 or more. The preferred polymers are rubbery substances having a hydrocarbon backbone and a number of active sites to permit them to be cured. The fluorinated hydrocarbon polymers are of particular value because of their resistance to attack by the other chemical components in the rocket propellant system.

If the oxidizer is highly reactive with the solid fuel, the fuel may be admixed with one polymer which is used as the outer layer of the tube while a fuel-free fluorinated hydrocarbon polymer may form the inner layer of the tube. Thus, the tube need not be a single layer but may consist of a plurality of layers containing varying amounts of fuel. Another method is to desensitize the inner wall of the tube prior to filling the tube with the oxidizer. This may be achieved by flushing the tube with a substance which is capable of combining with the fuel on the outer surface of the tube's inner wall and thereby render the fuel relatively unreactive with the oxidizing agent. For example, if the polymer is compounded with powdered aluminum, the tube may be flushed with 1 to 5 N hydrochloric acid. On the other hand, if the fuel is a hydride, such as aluminum hydride, the tube may be flushed with water before the oxidizing agent is introduced.

In addition to fuel, curing agents and accelerators, the polymer may be compounded with other ingredients to either improve its physical properties or increase its flexibility. The following recipes show how both curable and noncurable polymers may be compounded before they are extruded as tubes.

POLYMER RECIPES

| Ingredients | Parts By Weight | |
|---|---|---|
| | Curable Polymers | Noncurable Polymers |
| Polymer | 100 | 100 |
| Solid Fuel | 25–500 | 25–500 |
| Filler | 10–75 | 10–75 |
| Curing Agent | 1–20 | None |
| Accelerator | 1–10 | None |
| Metal Oxide | 1–20 | 1–20 |

It is understood that any one of the ingredients, except the polymer, may be omitted from the recipe. As pointed out above, it is sometimes desirable to mix all of the solid fuel with the oxidizing agent, thus leaving the tube free of fuel. Moreover, while fillers, such as carbon black and clay, may sometimes be used to give strength and rigidity to the tube, it is generally advisable to omit this ingredient from the recipe due to its poor burning properties. The curing agent may be sulfur, sulfur bearing compounds, quinone dioxime, polymethylol resins, or any of the well known curing agents. Among the accelerators which may be compounded with the polymer are diphenylguanidine, tetramethylthiuramdisulfide, tellurium diethyldithiocarbamate and morpholine disulfide. The metal oxide, which should be divalent, is generally magnesium or zinc oxide.

The preferred fuels are metals, including metal hydrides selected from Groups I-A, II-A, III-A and IV-B of the Periodic Chart of Elements in Lange's Handbook of Chemistry, 8th edition, pages 56–57. Suitable solid inorganic fuels include beryllium, titanium, lithium aluminum hydride, aluminum hydride, magnesium hydride, beryllium hydride, decaborane and especially aluminum, boron and magnesium.

The oxidizing agents which come within the purview of the invention are those organic and inorganic liquid substances which are high in oxygen and/or fluorine content, e.g. 40 wt. percent or more, and capable of reacting with the fuels described above upon ignition. Among the liquid oxidizing agents which may be used in accordance with the invention are peroxides, nitro compounds and fluorides such as hydrogen peroxide, nitromethane, tetranitromethane, red fuming nitric acid, white fuming nitric acid, concentrated nitric acid, bromine trifluoride, bromine pentafluoride, n-propyl nitrate and ethyl nitrate.

When the solid fuel is admixed with the liquid oxidizing agent, the fuel should comprise about 5 to 70 wt. percent and preferably about 10 to 50 wt. percent of the mixture. Regardless of whether the fuel is admixed with the oxidizing agent or the polymer that forms the tube, the total weight of oxidizing agent and fuel should be greater than that of the polymer and other compounding ingredients and preferably the polymer should not occupy more than 25 wt. percent of the total composition.

The hybrid rocket propellant system of the present invention has a number of advantages. For instance, the tubes could be vulcanized in the absence of the oxidizing agent and later filled with liquid oxidizer by pumping or injecting the liquid into the tubular system. Moreover, the tubular structure can be permanently stored and filled just prior to use. This would eliminate the danger of pre-ignition in storage. Because the tubes are flexible, they can be shaped to fit any rocket motor while still retaining sufficient structure to retain the appearances of a solid propellant.

The advantages of this invention are illustrated in the following examples. However, it is not intended that the invention should be limited to the specific ingredients and proportions employed in the examples.

EXAMPLE 1

Isobutylene-isoprene butyl rubber having a mole percent unsaturation of 1.5 to 2.0 and a Staudinger molecular weight of 40,000 is compounded with aluminum powder having an average particle size of 16 microns in accordance with the following recipe.

RECIPE A

| Ingredients: | Parts by weight |
|---|---|
| Butyl rubber | 175 |
| Aluminum powder | 875 |
| Zinc oxide | 15 |
| Sulfur | 4 |
| Tetramethylthiuramdisulfide | 4 |
| Benzothiazyldisulfide | 2 |

Butyl rubber is mixed with the other ingredients on a cold (less than 125° F.) rubber mill over a period of 1 hour. The aluminum powder is added to the butyl rubber slowly so that it requires about 45 minutes to admix all of it with the rubber. The compounded butyl rubber is then extruded in a Number Half Royal extruder at 150° F. through a die which produces a tube having an inside diameter of 50 mils and an outside diameter of 70 mils. A section of the tube 60 inches long is cured in a hot air oven under 30 p.s.i.g. pressure for 1 hour at 320° F. The cured tube has a tensile strength of greater than 50 p.s.i. and is quite flexible having an elongation of greater than 20%. The tube is filled by suction with 98 wt. percent hydrogen peroxide and then the single strand is ignited at the top and permitted to burn down. It appears to support combustion and produces white sparks indicating that the aluminum powder is burning. The filled tube contains 50 wt. percent hydrogen peroxide, 41 wt. percent aluminum powder and 9 wt. percent rubber and curatives.

EXAMPLE 2

The same butyl rubber employed in Example 1 is compounded in a similar manner according to the following recipe.

RECIPE B

| Ingredients: | Parts by weight |
|---|---|
| Butyl rubber | 525 |
| Zinc oxide | 45 |
| Sulfur | 24 |
| Tetramethylthiuramdisulfide | 12 |
| Benzothiazyldisulfide | 6 |
| Polyvinylpropylene ether | 105 |

The butyl rubber is extruded through a die to make a tube having an inside diameter of 125 mils and an outside diameter of 135 mils and is cured as described in the previous example. The tube has a tensile strength of greater than 50 p.s.i. and an elongation of greater than 20%, which meets the mechanical requirements for a solid propellant. A portion of the tube 6 inches long is filled by injection with a slurry of 98 wt. percent hydrogen peroxide and powdered aluminum and thickened with 0.05 wt. percent polystyrene sulfonate. The thickened hydrogen peroxide has a viscosity which is approximately twenty times that of the hydrogen peroxide solution before it is mixed with the sulfonate at room temperature. An aluminum powder having an average particle size of 16 microns is added to the thickened hydrogen peroxide to produce a slurry containing about 40 parts by weight of aluminum powder and 50 parts by weight of hydrogen peroxide which is thereafter injected into the tube. A single strand tube is burned from the top and it is noted that its combustion is quite smooth due to the intimate contact of the oxidizer with the fuel. It was estimated that this propellant system has a specific impulse of 280 lbs. second/lb.

EXAMPLE 3

Viton A, a tradename of E. I. duPont de Nemours for a copolymer of hexafluoropropylene and vinylidene fluoride having a Mooney viscosity ML4/212° F. of 67, a specific gravity of 1.85 and containing 65 wt. percent fluorine, is compounded with finely divided boron according to the following recipe:

RECIPE C

| Ingredients: | Parts by weight |
|---|---|
| Viton A | 100 |
| Boron | 40 |
| Zinc oxide | 10 |
| Dibasic lead phosphite | 10 |
| Hexamethylenediamine carbamate | 1.5 |

The polymer, which is compounded on a cold rubber mill, is extruded through a die to form a tube having an inside diameter of 50 mils and an outside diameter of 70 mils. A section of the tube is cured at 310° F. for 1 hour and thereafter filled by suction with tetranitromethane. The filled tube comprises 55 wt. percent tetranitromethane, 13 wt. percent finely divided boron and 32 wt. percent Viton and curatives. The propellant system is estimated to have a specific impulse of 283 lbs. second/lb.

EXAMPLE 4

Isobutylene-isoprene butyl rubber identical with that used in Example 1 is compounded with aluminum hydride according to the following recipe:

RECIPE D

| Ingredients: | Parts by weight |
|---|---|
| Butyl rubber | 100 |
| Aluminum hydride | 425 |
| Zinc oxide | 7 |
| Sulfur | 2 |
| Tetramethylthiuramdisulfide | 2 |
| Benzothiazyldisulfide | 1 |

The compounded rubber is extruded at 175° F. through a die to form a tube which has an inside diameter of 50 mils and an outside diameter of 70 mils. The tube is cured in a hot air oven under 30 p.s.i.g. pressure for 1 hour at 320° F. The inside of a section of the tube is washed with 5 N hydrochloric acid to convert any aluminum hydride on the inner surface to aluminum chloride. The outer surface of the tube is coated with nitrocellulose and adhered to several other tubes of the same size and length which are compounded, cured and treated in the same manner. The plurality of tubes is filled by suction with 98 wt. percent hydrogen peroxide to produce a rocket propellant having a specific impulse of greater than 300 lbs. second/lb. and comprising 42.3 wt. percent aluminum hydride, 47.8 wt. percent hydrogen peroxide and 9.9 wt. percent rubber and curatives.

Referring to the drawings, FIGURE I shows a plurality of circular tubes 3, the thickness of whose walls 4 is less than the open conduit 5 formed by each tube 3. The tubes 3 contain a polymer and in some instances large quantities of solid fuel. The conduits 5 may be filled with a liquid, e.g. an oxidizer having a substantial amount of solid fuel dispersed therein, or some other suitable substance. The tubes may have an adhesive substance in their interstices 6 which maintains them in intimate contact with each other so that their outer walls 7 are adacent to each other.

FIGURE II illustrates a preferred embodiment of the invention wherein the outer surface 7 of the walls 4 are hexagonally shaped. The conduit 5 may be either circular, hexagonal or any other suitable shape. This embodiment permits the outer surface 7 of the walls 4 to abut along their longitudinal line.

In addition to being used in a hybrid rocket propellant system, the tubes of the present invention may be employed wherever tubular packets or sponges have utility. For instance, tubes made with polymer (with or without powdered metal, e.g. aluminum) may be used as cushioning in helmets, chairs and other devices where a strong cellular substance has application.

Resort may be had to various modifications and variations of the present invention without departing from the spirit of the discovery or the scope of the appended claims.

What is claimed is:

1. A hybrid rocket propellant comprising a tubular packet of a plurality of tubes lying adjacent one another along their longitudinal axes, the walls of said tubes containing an extrudable rubbery polymeric substance which makes the tubes flexible, inner wall surfaces of each of said tubes defining conduits lying along the longitudinal axes of said tubes, outer surfaces of each tube being adhered to outer surfaces of adjacent tubes, and said conduits being substantially filled with a liquid oxidizing agent.

2. A hybrid rocket propellant according to claim 1, in which the liquid oxidizing agent is admixed with finely divided metal-containing fuel with which the oxidizing agent is compatible and is admixed with a thickening agent.

3. A hybrid rocket propellant according to claim 1, in which the rubbery polymeric substance in the walls of the tubes is a binder for admixed solid metal-containing rocket fuel substance.

4. A hybrid rocket propellant according to claim 3, in which the liquid oxidizing agent is hydrogen peroxide and the metal-containing fuel substance is aluminum.

5. A hybrid rocket propellant which comprises a tubular packet of a plurality of flexible tubes lying adjacent one another along their longitudinal axes, the walls of said tubes containing a rubbery polymeric substance having a hydrocarbon backbone and a Staudinger molecular weight of at least 10,000 suitable for extrusion into said tubes, inner wall surfaces of each of said tubes defining conduits lying along the longitudinal axes of said tubes, outer surfaces of tubes being adhered to outer surfaces of adjacent tubes in the packet, and said conduits being filled with a liquid oxidizing agent.

6. A hybrid rocket propellant according to claim 5, in which the tubes filled with the liquid oxidizing agent are sealed at each end.

7. A hybrid rocket propellant according to claim 5, in which the rubbery polymeric substance in walls of the tubes is compounded and cured with a curative agent.

8. A hybrid rocket propellant according to claim 5, in which the rubbery polymeric substance is isobutylene-isoprene butyl rubber cured with compounded curatives, the cured tubes having a tensile strength greater than 50 p.s.i. and an elongation greater than 20%.

9. A hybrid rocket propellant according to claim 8, in which the butyl rubber is compounded with aluminum powder as solid fuel and the tubes are filled with liquid hydrogen peroxide as liquid oxidizing agent.

10. A hybrid rocket propellant according to claim 8, in which the liquid oxidizing is liquid hydrogen peroxide containing a thickening agent and aluminum powder as fuel.

References Cited

UNITED STATES PATENTS

| | | | |
|---|---|---|---|
| 273,209 | 2/1883 | Wiard | 102—98 |
| 321,374 | 6/1885 | Lyman | 102—98 |
| 2,740,702 | 4/1956 | Mace | 52—.5 |
| 2,744,816 | 5/1956 | Hutchison | 52—.5 |
| 1,074,809 | 10/1913 | Newton | 102—98 |
| 2,802,332 | 8/1957 | Orsino | 60—35.6 |

OTHER REFERENCES

"Explosive Hazard of Al.-Liquid $O_2$ Mixtures," Journal of Chemical Education, vol. 36, No. 2, February 1959.

"Properties of Liquid-Oxygen Explosives," by G. St. J. Perrott; copyright 1924 by The American Institute of Mining and Metallurgical Engineers, Inc.

"Solid Fuels Vie for Propellant Lead," by Alfred J. Zaehringer; Missiles and Rockets Special Report, Aug. 11, 1958.

ROBERT F. STAHL, *Primary Examiner.*

SAMUEL BOYD, ARTHUR M. HORTON, SAMUEL FEINBERG, BENJAMIN A. BORCHELT, *Examiners.*